United States Patent [19]

Krueger, deceased et al.

[11] Patent Number: 5,069,297

[45] Date of Patent: Dec. 3, 1991

[54] DRILL PIPE/CASING PROTECTOR AND METHOD

[75] Inventors: R. Ernst Krueger, deceased, late of Newport Beach, by Vera B. Krueger, legal representative; William E. Krueger, Orange, both of Calif.

[73] Assignee: Rudolph E. Krueger, Inc., Newport Beach, Calif.

[21] Appl. No.: 523,763

[22] Filed: May 15, 1990

Related U.S. Application Data

[63] Continuation-in-part of Ser. No. 469,632, Jan. 24, 1990, abandoned.

[51] Int. Cl.⁵ .................. E21B 12/00; E21B 17/10
[52] U.S. Cl. .................................. 175/65; 175/325; 166/241
[58] Field of Search .................. 175/325, 320, 57; 166/241

[56] References Cited

U.S. PATENT DOCUMENTS

| | | | |
|---|---|---|---|
| 2,308,316 | 1/1943 | Smith et al. | 175/325 |
| 2,318,878 | 5/1943 | Miller | 175/325 |
| 2,368,415 | 1/1945 | Grant | 175/325 |
| 2,715,552 | 8/1955 | Lane | 175/325 |
| 2,860,013 | 11/1958 | Medearis | 175/325 |
| 3,063,759 | 11/1962 | Moore et al. | 175/325 |
| 3,088,532 | 5/1963 | Kellner | 175/230 |
| 3,320,004 | 5/1967 | Garrett | 175/325 |
| 3,397,017 | 8/1968 | Grant et al. | 175/325 |
| 3,410,613 | 11/1968 | Kuus | 175/325 |
| 3,528,499 | 9/1970 | Collett | 166/175 |
| 3,999,811 | 12/1976 | Gray | 175/325 |
| 4,071,101 | 1/1978 | Ford | 175/325 |
| 4,083,612 | 4/1978 | Olson | 166/241 X |
| 4,796,670 | 1/1989 | Russell et al. | 175/325 X |

Primary Examiner—Stephen J. Novosad
Attorney, Agent, or Firm—Christie, Parker & Hale

[57] ABSTRACT

A drill pipe/casing protector is mounted on a length of drill pipe adjacent to the tool joint of a length of rotary drill pipe that rotates within a well bore or a casing cemented in a well bore in which drilling operations are conducted. The drill pipe/casing protector comprises a protective sleeve preferably made from a compressible material secured to the exterior of the drill pipe to rotate with the drill pipe during normal drilling operations and to contact the casing and thereby prevent damaging contact between the rotary drill pipe and the casing. The sleeve rotates with the drill pipe during normal drilling operations in which there is an absence of contact between the sleeve and the casing, but the sleeve stops rotating or rotates very slowly while allowing the drill pipe to continue rotating within the sleeve upon frictional contact between the sleeve and the casing. One or more thrust bearings rigidly affixed to the drill pipe maintain the sleeve in a fixed axial position on the drill pipe even during contact between the sleeve and the casing. The relative rotation between the sleeve and drill pipe during contact reduces torque on the rotary drill pipe compared with a conventional protector rigidly affixed to and rotatable with the drill pipe. The sleeve mounting arrangement includes spaced apart longitudinal grooves and wedged I.D. faces between the grooves for circulating drilling fluid through the space between the sleeve and rotary drill pipe for maintaining a fluid film in the space to reduce frictional drag between the rotating drill pipe and the sleeve when the sleeve stops rotating upon contact with the casing. The thrust bearings are likewise designed to reduce induced torque by pumping fluid through a series of ramps and slots to lubricate and support the sleeve.

46 Claims, 9 Drawing Sheets

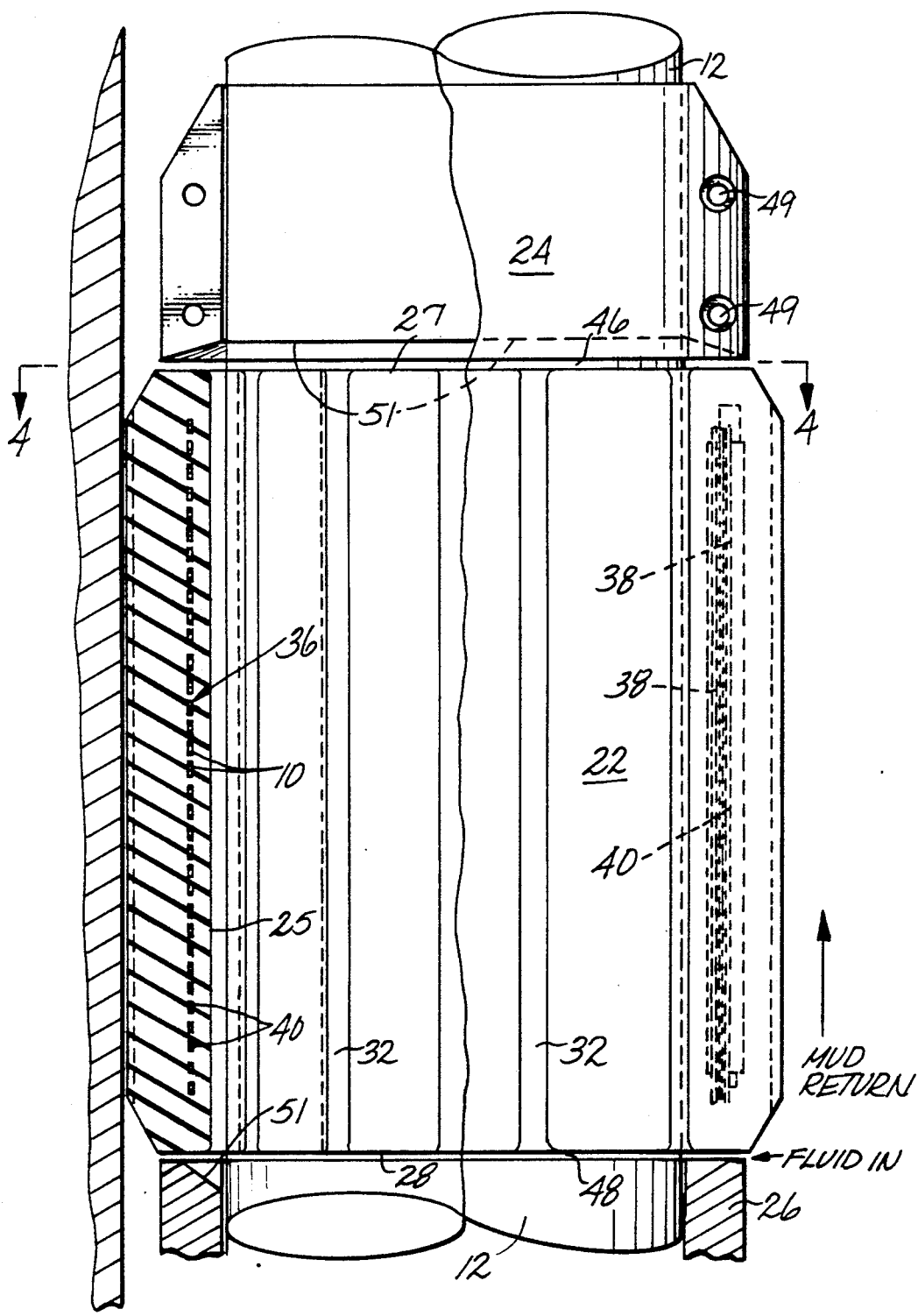

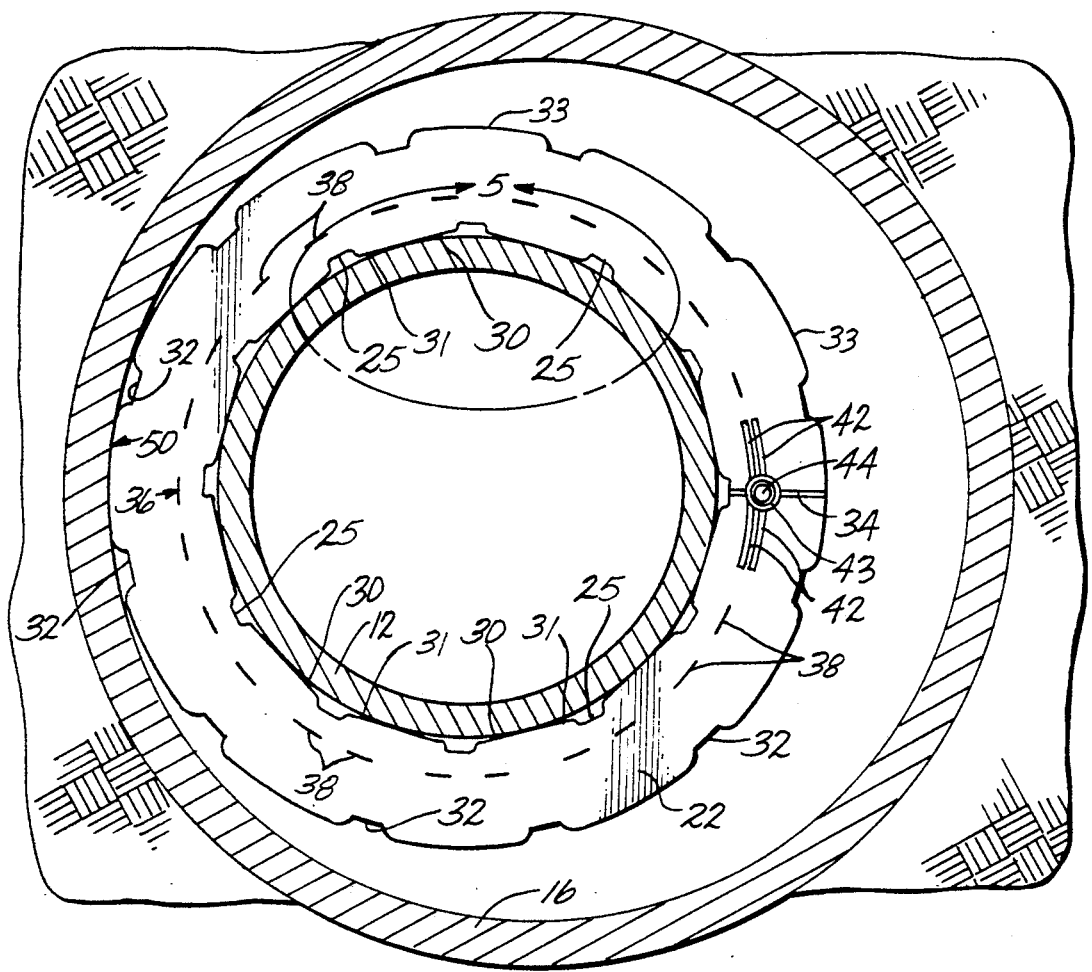
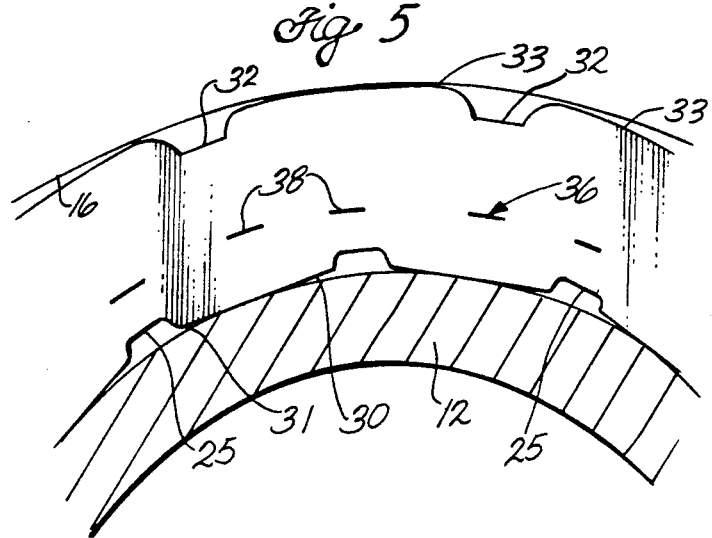

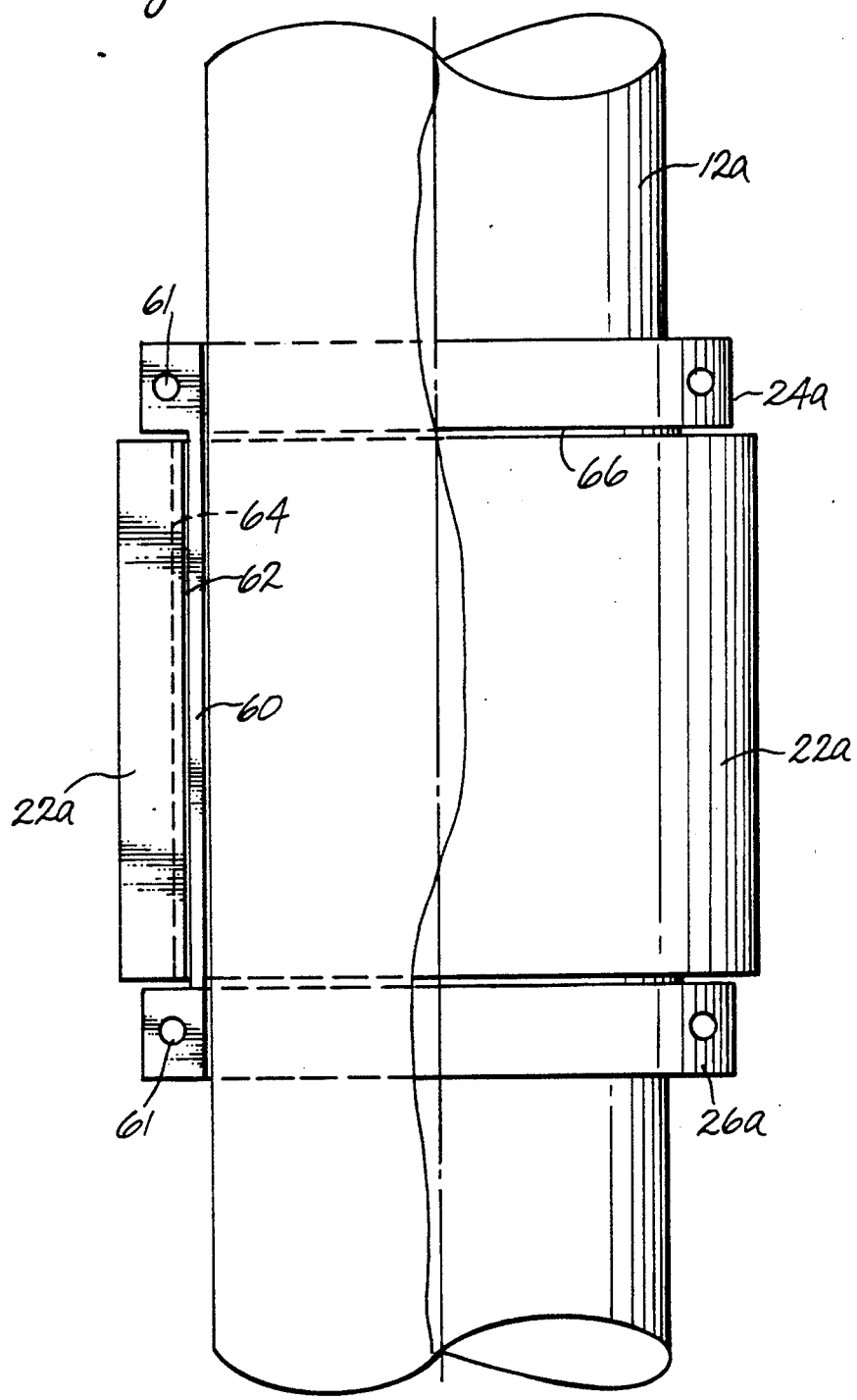

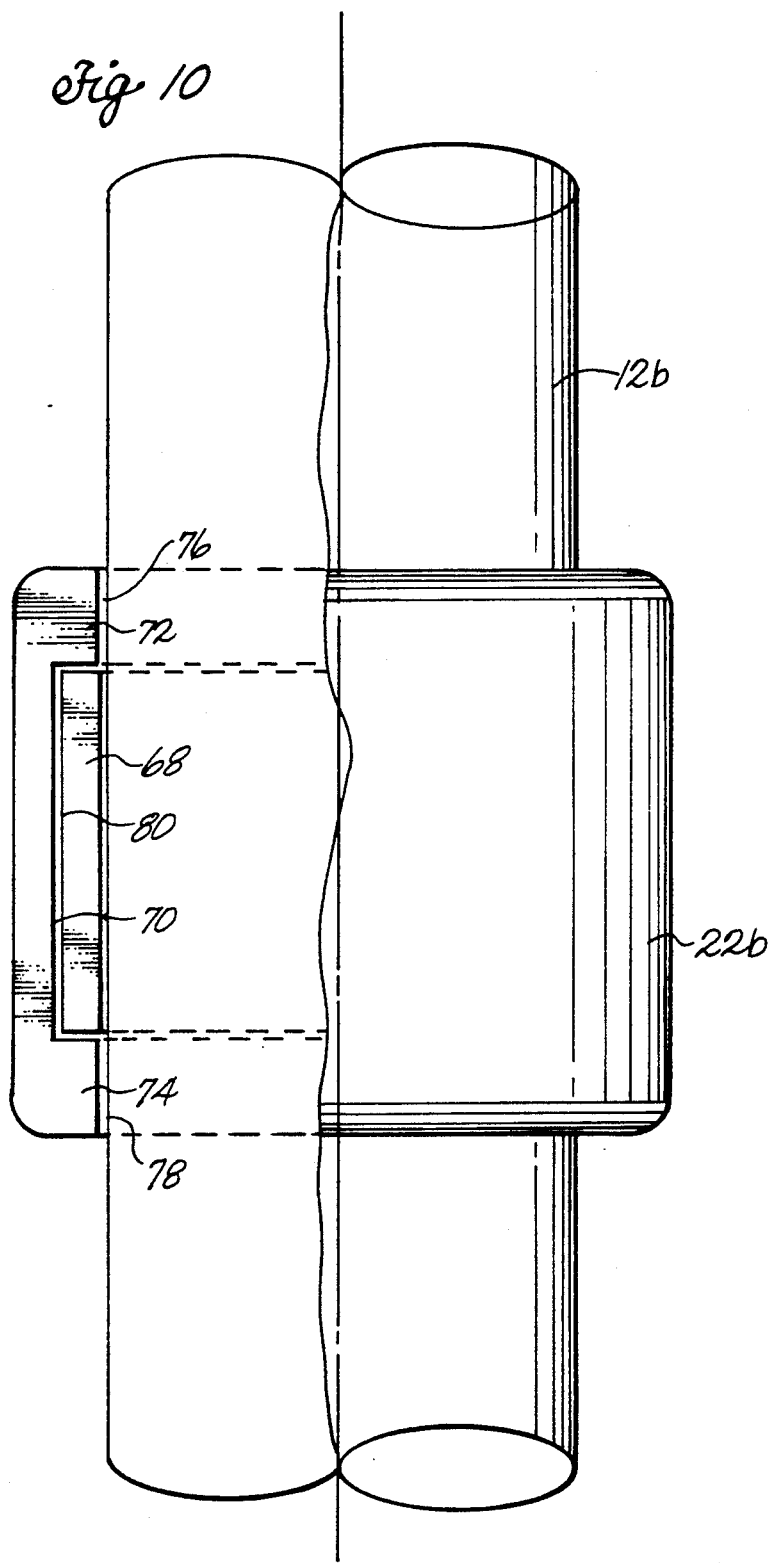

DRILL PIPE/CASING PROTECTOR AND METHOD

CROSS-REFERENCE

This is a continuation-in-part of our application Ser. No. 07/469,632, filed Jan. 24, 1990, now abandoned which is incorporated herein by this reference.

FIELD OF THE INVENTION

This invention relates generally to drill pipe/casing protectors, and more particularly to a drill pipe/casing protector that reduces the torque experienced by a rotating drill pipe when the attached protector comes into contact with a well casing or the wall of a formation being drilled.

BACKGROUND OF THE INVENTION

In the drilling of oil and gas wells, a drill bit attached to the bottom of a drill string bores a hole into underground formations. A drill string typically comprises a long string of connected drill pipe sections that extend from the surface into a well bore formed by the drill bit on the bottom of the drill string. Casing is typically installed at various depths throughout the well bore from the surface to prevent the wall of the bore from caving in; to prevent the transfer of fluids from the various drilled formations from entering into the well bore, and visa versa; and to provide a means for recovering petroleum if the well is found to be productive.

During rotary drilling operations, the drill pipe is subjected to shock and abrasion whenever the drill pipe comes into contact with the walls of the well bore or the casing itself. In many drilling operations, the drill pipe may extend underground along a curved path, rather than extending vertically; and in these instances a considerable amount of torque can be induced by the effects of the frictional forces developed as a result of the rotating drill pipe with its protectors coming into contact with the casing or the wall of the well bore.

In the past, drill pipe protectors have been placed in different locations along the length of the drill pipe to keep the drill pipe and its connections away from the walls of the casing and/or formation. These drill pipe protectors have been typically made from rubber or other elastomeric materials because of their ability to absorb shock and impart minimal wear. Typical prior art drill protectors are shown in U.S. Pat. Nos. 4,796,670 Russell, et al.; 4,266,578-Swain, et al.; and 3,480,094 typically solid rubber protectors having an outside diameter (O.D.) greater than that of the drill pipe tool joints, and these protectors are typically installed or clamped rigidly onto the O.D. of the drill pipe at a point near the tool joint or the connection of each length of drill pipe. Such an installation allows the rubber protector only to rub against the inside wall of the casing as the drill pipe is rotated. Although wear protection for the casing is the paramount result when using such drill pipe protectors, they can produce a significant increase in the rotary torque developed during drilling operations. The problem that prevails is that current protectors (there can be hundreds of these protectors in the well bore at any one time) can generate sufficient cumulative torque or drag at a radius sufficient to effectively curtail drilling operations if the power required to rotate the drill pipe approaches or exceeds the supply power available. An additional problem occurs when the drill pipe begins failing in torsion due to the high levels of torque produced in response to the drag generated by the current drill pipe protectors.

In the past, the problems of wear protection for the casing along with torque build-up have been addressed through improvements directed toward producing drill pipe/casing protectors from various low friction materials in different configurations. To date experience has shown that these techniques have only been marginally effective, and oil companies are still searching for effective means to greatly reduce the wear and frictionally developed torque normally experienced when drilling deeper wells and directional wells, including horizontal well bores.

SUMMARY OF THE INVENTION

This invention provides a drill pipe/casing protector which reduces the torque developed when the rotating drill pipe/casing protector contacts the walls of a formation or the casing in a well bore, thereby extending the useful life of the protector and reducing drill pipe/casing wear.

Briefly, one embodiment of the invention comprises a drill pipe/casing protector assembly which includes a protective sleeve secured to the exterior to the drill pipe. The sleeve has an outside diameter larger than the outside diameter of the drill pipe and the drill pipe's tool joints, to provide protection for the casing (or bore) when contact is made between the casing (or bore) and the sleeve. The sleeve is mounted to the drill pipe so that the sleeve is allowed to rotate with the drill pipe during normal drilling operations in which there is an absence of contact between the sleeve and the casing or bore; but the sleeve is allowed to essentially stop rotating, or at least greatly reduce its rotational rate, while allowing the drill pipe to continue rotating within the sleeve, when frictional contact occurs between the outside of the sleeve and the inside wall of the casing or bore. By causing such relative rotation between the sleeve and the rotating drill pipe, the torque applied to the drill pipe upon contact between the sleeve and the casing or bore is greatly reduced. In one embodiment, the amount of torque reduction is related to the distance between the O.D. of the drill pipe protector and the O.D. of the drill pipe itself, i.e., the change in the points of relative rotation upon contact between the sleeve and the casing or bore. The resulting torque reduction can be substantial and, depending upon the dimensions of the drill pipe and drill pipe protector involved, the torque reduction can be in the neighborhood of 30%, as described in more detail below.

In another embodiment of the invention, the inside wall of the sleeve has a "double-wedge" bearing arrangement which includes a means for producing a film of lubricating fluid at the interface between the outside of the drill pipe and the inside of the sleeve. This film of fluid is preferably produced by configuring the inside of the sleeve to enable drilling fluid in the annulus between the drill pipe and casing (or well bore) to be forced under pressure through the space between the sleeve and the drill pipe and produce a thin film of fluid at this interface which separates the sleeve from the drill pipe during rotation of the drill pipe within the sleeve. This fluid film also acts to reduce the frictional drag or resultant torque imposed on the drill pipe significantly when contact is made between the outside wall of the sleeve and the wall of the casing or well bore.

As a result of this invention, wear protection is improved for the casing, the drill pipe and the protector itself; and the reduced cumulative drag acting on the rotary drill pipe, particularly for directional drilling configurations, allows drilling to greater depths.

These and other aspects of the invention will be more fully understood by referring to the following detailed description and the accompanying drawings.

BRIEF DESCRIPTION OF THE DRAWINGS

FIG. 3 is a fragmentary side view, partly in cross section and partly in elevation, showing a drill pipe protector assembly according to this invention mounted near the tool joint of a length of drill pipe which has been run inside a casing installed in a well bore.

FIG. 4 is a top view, partly in cross section, taken on line 4—4 of FIG. 3.

FIG. 5 is a fragmentary, enlarged cross-sectional view taken within the line 5—5 of FIG. 4.

FIG. 9 is a semi-schematic, fragmentary side view, partly in cross section and partly in elevation, showing an alternative means for mounting the drill pipe protector assembly of this invention adjacent to the tool joint of a drill pipe which has been run inside a casing installed in a well bore.

FIG. 10 is a semi-schematic, fragmentary side view, partly in cross section and partly in elevation, showing a further alternative means of mounting a drill pipe protector assembly of this invention to a drill pipe.

DETAILED DESCRIPTION

Figure 1:
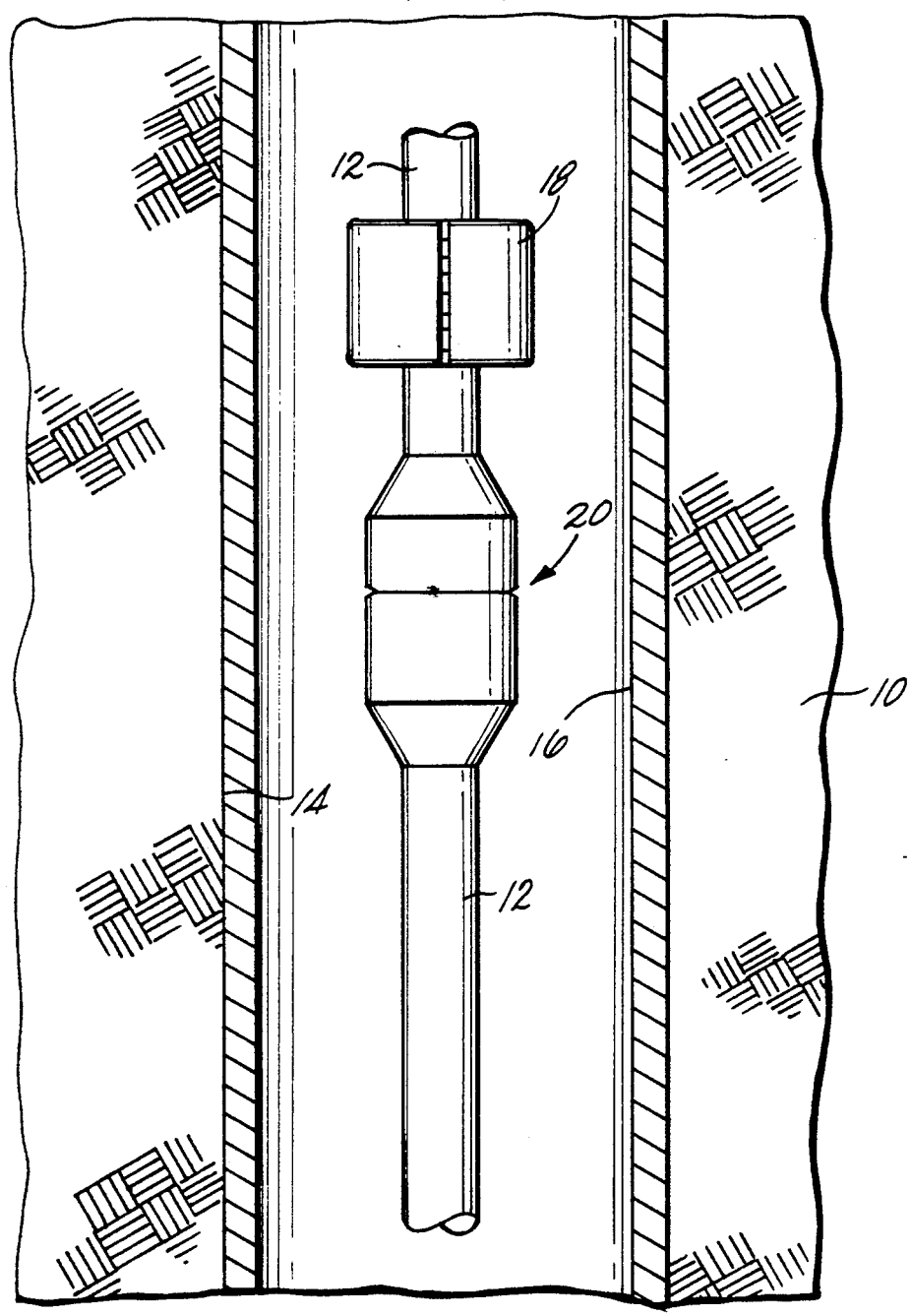
FIG. 1 is a semi-schematic fragmentary side elevational view, partly in cross section, showing a prior art drill pipe protector mounted adjacent to a drill pipe tool joint on a section of drill pipe inside a casing which has been cemented in an underground formation.

FIG. 1 illustrates a prior art drilling arrangement for drilling a well in an underground formation 10. A rotary drill string comprising sections of drill pipe 12 drills a well bore 14 with a drilling tool (not shown) installed on the bottom of the drill string. An elongated cylindrical casing 16 is cemented in the well bore to support the formation around the bore. The invention is described with respect to its use inside casing in a well bore, but the invention also can be used to protect the drill pipe from damage caused by contact with the wall of a bore that does not have a casing. Therefore, in the description and claims to follow, where reference is made to contact with the wall or inside diameter (I.D.) of a casing, the description also applies to contact with the wall of a well bore; and where reference is made to contact with a bore, the bore can be the wall of a well bore or the I.D. of a casing.

Referring again to FIG. 1, separate longitudinally spaced apart drill pipe protectors 18 are mounted along the length of the drill string to protect the casing from damage that can occur when rotating the drill pipe, together with its tool joints, inside the casing. Only one drill pipe protector is shown in FIG. 1 for simplicity. The drill string or casing can deviate from a vertical path during drilling operations, and contact between the drill pipe and the wall of the casing is undesirable. The sections of drill pipe are connected together in the drill string by separate drill pipe tool joints 20 which are conventional in the art.

The separate drill pipe protectors 18 are mounted to the drill string adjacent to each of the tool joints to reduce shock and vibration to the drill string and abrasion to the inside wall of the casing. When the drill pipe is rotated inside the casing, its tool joints would normally be the first to rub against the inside of the casing, and this rubbing action will tend to wear away either the casing or the outside diameter of the drill pipe or its tool joints, which can greatly reduce the protection afforded the well or the strength of the drill pipe or the tool joint itself. To prevent this damage from occurring, the outside diameter of the drill pipe protector, which is normally made from a rubber material, is greater than that of the drill pipe tool joints. Such an installation allows the rubber protector only to rub against the casing as the drill pipe is rotated. These rubber protectors can generate substantial cumulative torque along the length of the drill string, particularly when the hole is deviated from vertical (in which case the drill pipe is pulled like a catenary which acts to drive the rubber protector into the casing). This adversely affects drilling operations primarily by producing friction and accompanying torque, and the present invention provides a solution to this problem.

Figure 2:
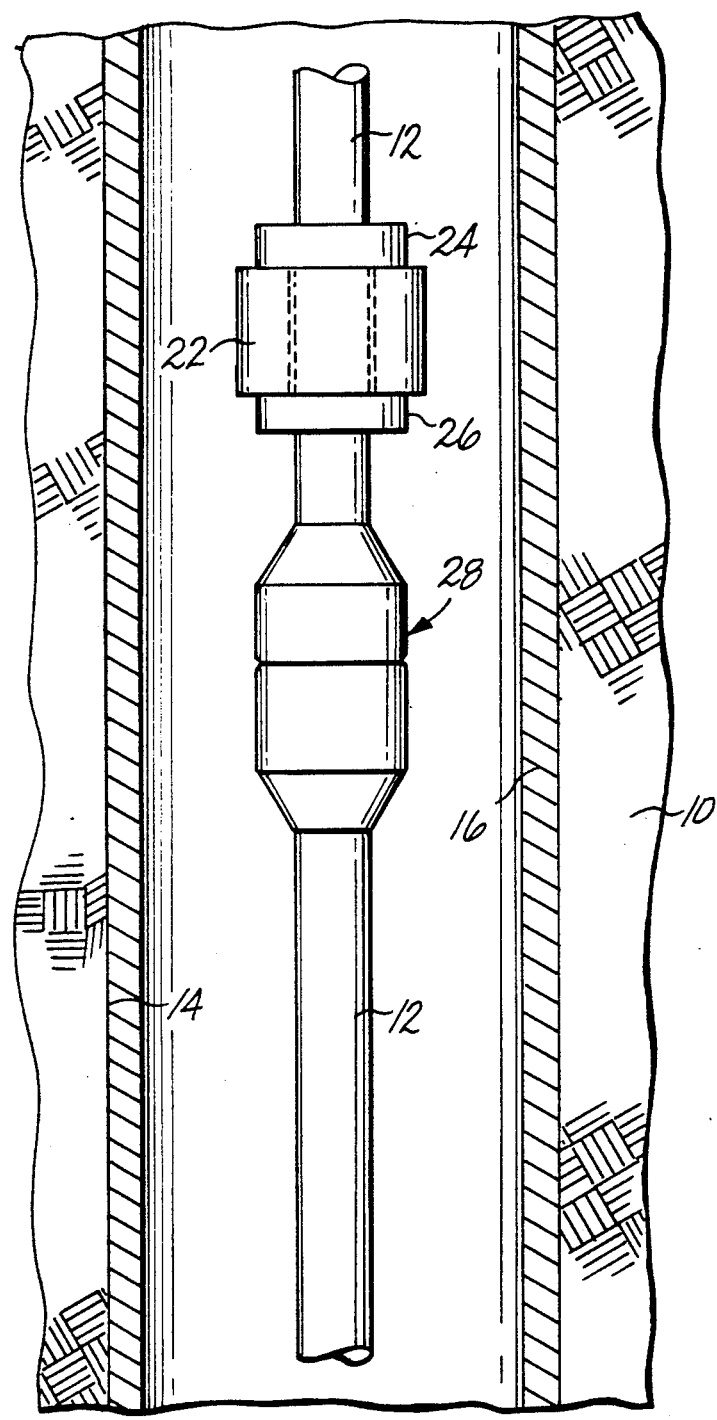
FIG. 2 is a semi-schematic fragmentary side elevational view, partly in cross section, illustrating a drill pipe protector, according to principles of this invention, mounted on a drill pipe section located inside a casing which has been cemented or otherwise fixed in a bore in a formation.

FIG. 2 schematically illustrates a drill pipe protector assembly according to principles of this invention. A protective sleeve 22 is sandwiched between upper and lower thrust bearings 24 and 26 which are rigidly affixed to the O.D. of the drill pipe. The sleeve protects against wear on the drill pipe and its tool joints and on the inside wall of the casing or a surrounding well bore, upon contact between the rotating drill pipe (and its tool joints) and the casing or bore. The drill pipe protector sleeve is mounted to the drill pipe using techniques which hold the protector on the drill pipe and which allow the sleeve to normally rotate with the drill pipe during drilling operations; but when the drill pipe protector sleeve comes into contact with the casing (or well bore) the sleeve stops rotating or at least slows down substantially while allowing the drill pipe to continue rotating inside the sleeve. This change in point of rotation, in effect, reduces the distance over which the rolling friction associated with drill pipe rotation is applied to the drill pipe. As a result, the torque applied to the rotary drill string during contact between the sleeve and casing is reduced compared to the prior art arrangement illustrated in FIG. 1. This change in radius of relative rotation and its effects on torque reduction will be described in more detail below.

FIGS. 3 and 4 better illustrate detailed construction of the drill pipe protector sleeve 22 and the system for mounting the sleeve and the thrust bearings 24 and 26 to the drill pipe. The drill pipe protector preferably comprises an elongated sleeve made from a suitable protective material such as a low friction and somewhat compressible material. A preferred material is an elastomeric material such as nitrile rubber having good high temperature resistance and resistance to oil and drilling fluids. A molded nitrile rubber having a Shore A hardness of at least 70 is preferred. Another suitable protective material is phenolic; however, a variety of suitable protective materials such as metals, plastics, etc., can be designed by those skilled in the art to fit particular requirements.

The sleeve 22 has an inside diameter configured in a double wedge arrangement which includes a plurality of longitudinally extending parallel grooves 25 spaced apart circumferentially around the I.D. of the sleeve. The grooves 25 are preferably spaced uniformly around the I.D. of the sleeve, are open ended in the sense that they open through an annular top end 27 and an annular bottom end 28 of the sleeve; and they are preferably of uniform width, but can be of any desirable width from one end to the other. The inside wall of the sleeve is divided into intervening wall sections of equal width extending parallel to one another between adjacent pairs of the grooves 25. Each wall section has an inside face with a double-wedge shaped configuration formed by a first wall section 30 in which one-half of the intervening wall section tapers narrower from one groove toward the center of the wall section, and a second wall section 31 in which the other half of the intervening wall section tapers narrower from the adjacent groove toward the center of the same intervening wall section. This double-wedge configuration allows the sleeve, during use, to reduce frictional drag between the I.D. of the sleeve and the O.D. of the drill pipe during contact between the sleeve and the wall of the casing, as described in more detail below.

The wall thickness of the sleeve 22 is such that the drill pipe protector has an O.D. greater than the O.D. of the adjacent drill pipe tool joints 28. The O.D. of the sleeve itself has a plurality of uniformly spaced apart, narrow, parallel outer grooves 32 extending from one end of the sleeve to the other. Intervening double-wedge sections 33 are formed by the O.D. wall of the sleeve between the outer grooves 32. The outer grooves act much the same as the outer grooves 25 located on the sleeve I.D. in that they allow fluid to circulate through them during use, and while the sleeve is rotating on the drill pipe, it tends to wipe fluid from the grooves and force the fluid into adjacent wedge sections, between the outer grooves, in a manner similar to the sections 30 and 31 on the I.D. of the sleeve. This action of the fluid being forced into the wedge sections of the sleeve will be described in more detail below.

The drill pipe protector sleeve is split longitudinally at 34 to provide a means for spreading apart the opposite sides of the sleeve when mounting the sleeve to the O.D. of the drill pipe 12. A metal cage 36 forms an annular reinforcing ring embedded in the molded body of the sleeve. The purpose of the cage or insert is to provide the required strength to the sleeve itself so that the cage can absorb the tensile and shear forces experienced by the sleeve when operating in the casing or well bore. The sleeve thus uses the cage or insert to absorb the forces, while allowing the sleeve to keep the drill pipe, together with its tool joints, from coming into contact with the casing or well bore. The reinforcing cage or insert can be made from an expanded metal, metal sheet stock, or metal strips. One preferred technique is to form the reinforcing member from a stainless steel cylinder with holes distributed throughout the cylinder. In any event, the metal reinforcement is distributed throughout and embedded within the wall of the elastomeric sleeve as depicted by the spaced apart reinforcing members 38 and 40 schematically illustrating the metal reinforcement. A first set of vertically spaced apart fastening fingers (not shown) project from one side of the split 34, and a cooperating set of vertically spaced apart metal fastening fingers (not shown) project from the opposite side of the split. These fingers are integrally affixed to the metal cage 36 through metal reinforcing members 42 affixed to the metal cage and embedded in the molded rubber sleeve. In mounting the sleeve to the O.D. of the drill pipe 12, the fingers are interleaved and spaced apart vertically to receive a latch pin 44 which is driven through vertically aligned holes in the finger. This draws opposite sides of the sleeve together around the O.D. of the drill pipe and thus closes the sleeve on the drill pipe. The above metal components are attached to the fingers or hinges in strong fashion allowing the locking pin to be driven through the matching eyes of the hinge, and thus securely closing the sleeve.

FIG. 3 illustrates the upper and lower thrust bearings 24 and 26 which are rigidly affixed to the O.D. of the drill pipe above and below the drill pipe protector sleeve. The typical thrust bearing is made from, but not limited to, plastic collars that encircle the drill pipe and project outwardly from the drill pipe. The collars project a sufficient distance to provide a means for retaining the sleeve in a fixed axial position on the drill pipe confined between the two thrust bearings. The thrust bearings are rigidly affixed to the drill pipe and rotate with the drill pipe, and the FIG. 3 illustration is one embodiment of a thrust collar and retaining clamp assembly used above and below the sleeve. The upper and lower thrust bearings 24 and 26 are affixed to the drill pipe to provide a narrow working clearance 46 between the bottom of the upper thrust bearing 24 and the annular edge 27 of the sleeve and a separate narrow working clearance 48 between the top of the lower thrust bearing 26 and the bottom annular edge 28 of the sleeve. In one embodiment, the bearings above and below the sleeve are at least about three inches in vertical height to provide sufficient surface area to grip the pipe to provide a means for securely holding them in a rigid fixed position on the drill pipe. The bearings are preferably split and bolted with four stainless steel cap screws 49 on outer flanges of the collar.

In one embodiment, to provide an example of comparative dimensions involved in the prior art arrangement illustrated in FIG. 1 and the embodiment illustrated in FIG. 2, the drill pipe can have an O.D. of five inches and the drill pipe tool joint can have a O.D. of 6.5 inches. The prior art rubber protector shown in FIG. 1 can have an O.D. of seven inches; and in the embodiment shown in FIG. 2, the drill pipe protector can have an O.D. of seven inches and the upper and lower thrust bearing can have an O.D. of about 6.5 inches.

During use, when the rotary drill pipe is rotated within the casing or the well bore, the outer surface of the drill pipe protector will come into contact with the interior surface of the casing or well bore. Contact with the inner wall of the casing is shown best at 50 in FIG. 4. The outside diameter of the drill pipe protector sleeve is large enough to protect the drill string from contact with the casing or bore. The rubber sleeve which is normally fixed in place on the drill pipe rotates with the drill pipe during normal drilling operations. However, under contact with the inside wall of the casing, the sleeve stops rotating, or its rotational speed is greatly reduced, while allowing the drill pipe to continue rotating inside the sleeve. The means for mounting the I.D. of the sleeve to the O.D. of the drill pipe provides slippage between the sleeve and the rotating drill pipe such that the drill pipe can continue rotating while the sleeve, upon contact with the casing, will nearly stop (it may rotate ever so slightly), and yet its stoppage exerts minimal frictional drag on the O.D. of the rotating drill pipe. The double-wedge bearing arrangement between the I.D. of the sleeve and the O.D. of the drill pipe causes circulating drilling fluid (within the annulus between the casing and the drill pipe) to flow under pressure through the clearance area 48 at one end of the sleeve and through the parallel grooves 25 to the clearance area 46 at the opposite end of the sleeve (the clearances are between the ends of the sleeve and the upper and lower thrust bearings.) This produces a circulating flow of fluid under pressure at the interface between the sleeve and drill pipe, and this fluid becomes forced into the wedge shaped regions between the grooves 25. This spreads apart the wedged shaped surfaces 30 and 31 to produce a thin film of fluid between the sleeve and the drill pipe (in much the same way as a crank shaft in an engine is lubricated and supported by a hydrodynamic cushion of oil), and this thin film of fluid at the interface reduces frictional drag. This action of the fluid being forced into the wedge acts to force the two adjacent surfaces apart. Such action thereby reduces the friction that would normally be experienced both on the O.D. and the I.D. of the sleeve due to the fact that a thin film of fluid is separating the two surfaces. The I.D. of the sleeve is no longer directly rotating against the O.D. of the drill pipe, or conversely, the O.D of the sleeve trying to rotate against the I.D. of the casing; and since the fluid film now separates both of these surfaces, and since the fluid has a lower coefficient of friction than either of the two surfaces, the torque developed as a result of rotation is greatly reduced.

The thrust bearings at opposite ends of the sleeve cooperate to retain the sleeve axially on the drill pipe. They also assist in pumping the fluid for reducing friction as the sleeve contacts the wall of the casing while the drill pipe rotates. During use, the clearance areas 46 and 48 above and below the sleeve provide a means for circulating the surrounding drilling fluid into the annular space between the sleeve and drill pipe. More specifically, and with reference to FIG. 3, relief areas 51 are formed in the bottom annular edge of the upper thrust bearing 24 and in the upper annular edge of the lower thrust bearing 26. The relief area encircles the thrust bearing adjacent the top and bottom annular edges of the sleeve and provides a region to which fluid can flow during rotation of the drill pipe, particularly in the upper relief space where the hydrostatic head causes fluid flowing up in the channels 25 to be trapped in the space at 51. This causes the trapped fluid to hover in the relief area 51 and act as a wedge to apply pressure sufficiently to keep the outside bearing shoulder away from the top of the sleeve when the drill pipe is rotating and when contact is made between the sleeve and the casing (or bore). This wedge cushion of fluid trapped in the relief area thus maintains the separation between the thrust bearings and the sleeve during use.

To provide further means for ensuring a good circulation of fluid to the interface between the sleeve and drill pipe, radially extending and spaced apart narrow recessed regions (not shown) can be formed in the top edge 27 and bottom edge 28 of the sleeve to provide further means for transmitting the fluid to and from the interface.

By allowing the drill string to rotate relative to the sleeve upon the sleeve striking the wall of the casing or well bore, a reduction in torque on the rotating drill string is produced by a corresponding reduction in radius over which the frictional force (generated between the I.D. of the sleeve and the O.D. of the drill pipe) is applied. In the prior art fixed rubber drill pipe protector, the torque exerted on the drill string is proportional to the outside radius of the rubber protector itself which, in the embodiment described above, is 3.5 inches. By comparison, the torque applied to the rotating drill string using the drill pipe protector sleeve of this invention is effective over a radius extending to the outside diameter of the drill pipe (or the inside wall of the sleeve). Since the radius of the drill pipe outside diameter is shorter by one inch (in the illustrated embodiment) than the radius of the outside diameter of the prior art protector, the torque is reduced by an amount proportional to this change in distance, i.e.:

$$\Delta T = \frac{\text{Change in Radius}}{\text{Original Radius}} = \frac{(3.5 - 2.5) \text{ inches}}{3.5 \text{ inches}} = 28.57\%$$

This calculation of reduced torque does not take into account the reduction in friction developed by the drill pipe protector as a result of fluid being forced between the two surfaces as rotation takes place.

As a further advantage, the circulating drilling fluid passing through the interface between the sleeve and drill pipe not only reduces the coefficient of friction between the rubber sleeve and drill pipe, but also provides a heat transfer medium for cooling the rubber as the fluid flows in the longitudinal channels 25.

Conventional prior art drill pipe protectors can become torn up and twisted off the drill string because of large applied torque loads; and as a result, in many drill strings, the rubber drill pipe protectors can be replaced as often as every few days. With the present invention, drill pipe protector life can be extended considerably and there is less torque build up produced along the length of the drill string. This not only reduces the time lost in replacing the sleeve but also extends the distance over which drilling can be conducted because of the reduced accumulated torque on the drill string.

Figure 6:
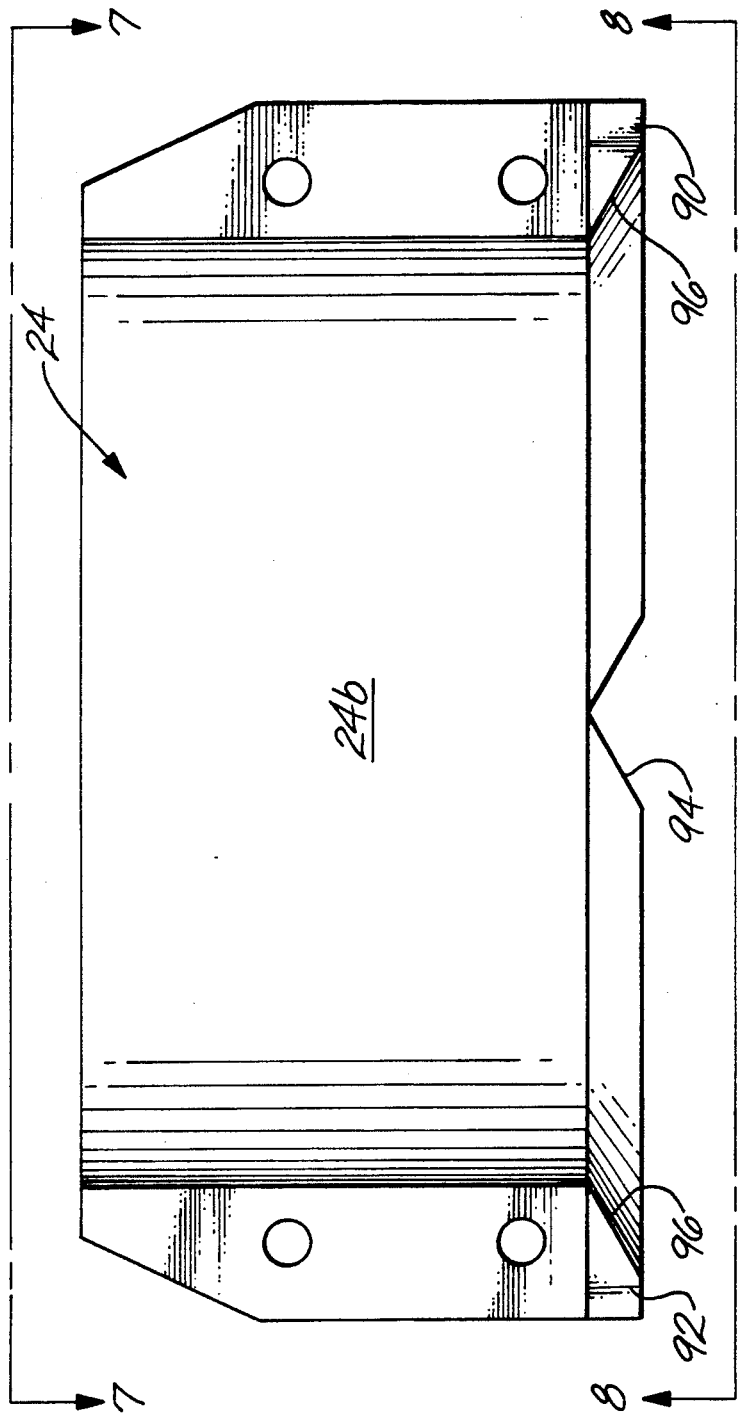
FIG. 6 is a side elevation showing detailed construction of a bearing used with the drill pipe protector.
Figure 7:
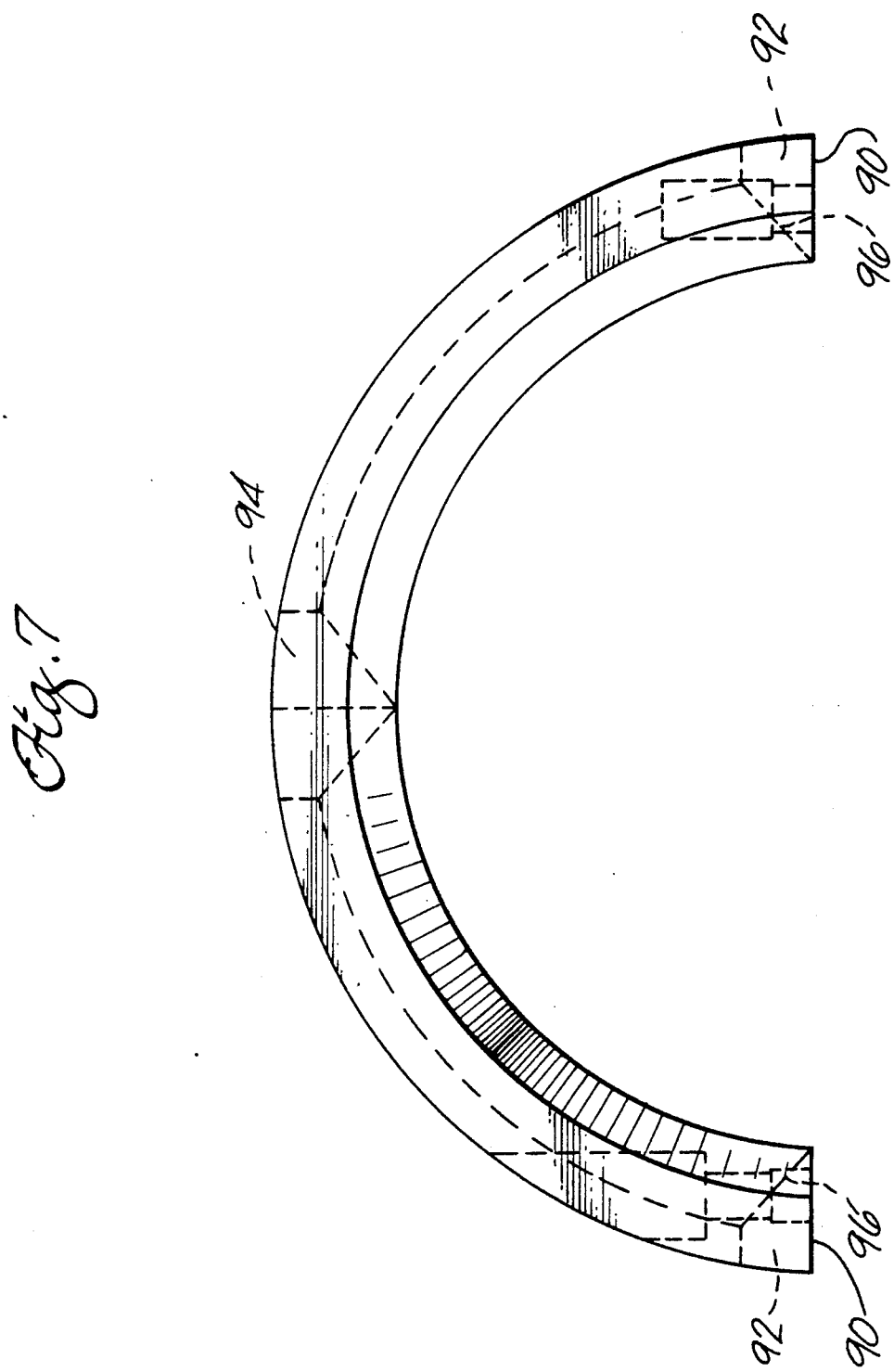
FIG. 7 is a top view taken on line 7—7 of FIG. 6.
Figure 8:
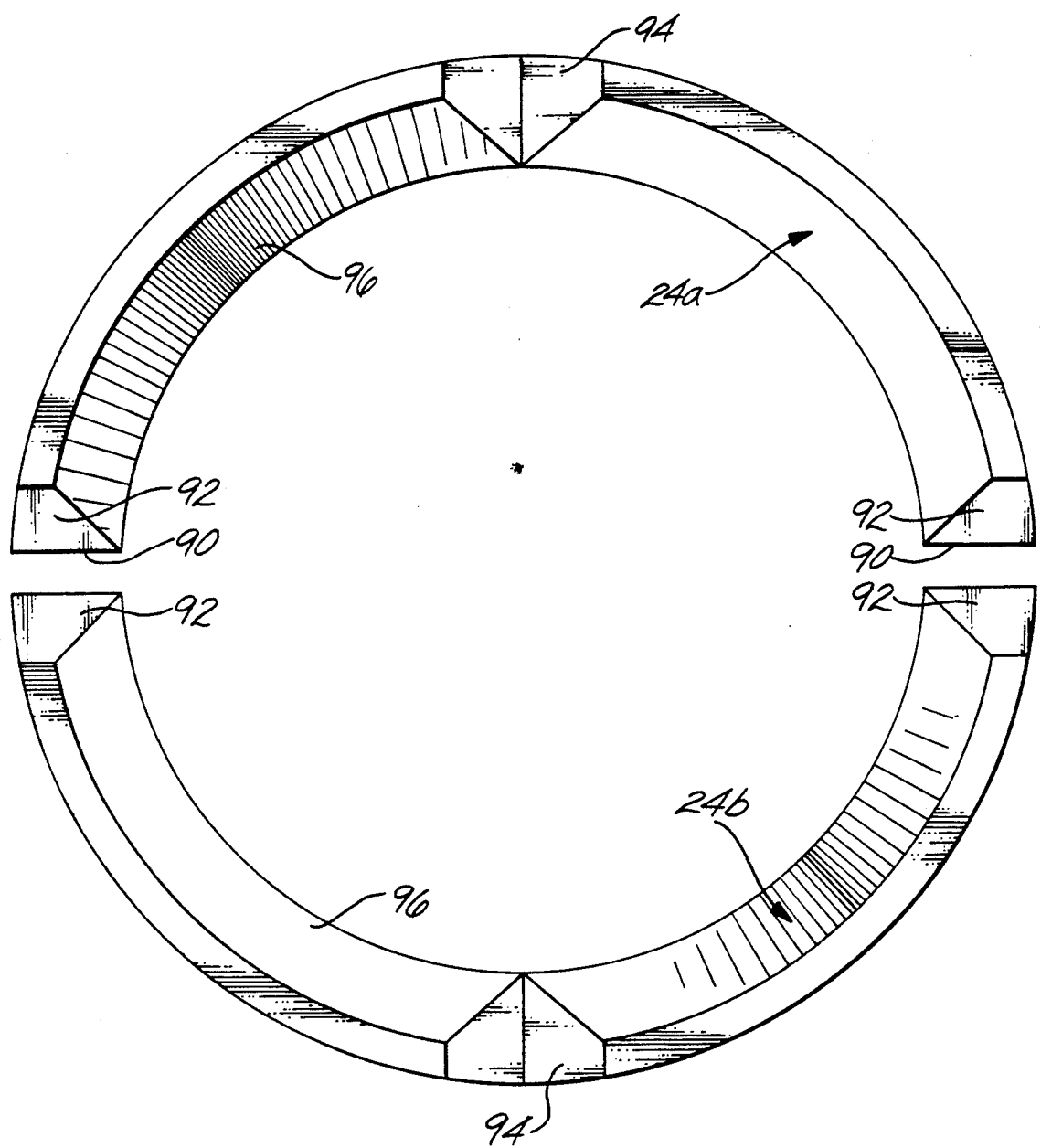
FIG. 8 is a bottom view taken on line 8—8 of FIG. 6.

FIGS. 6 through 8 illustrate detailed construction of the thrust bearing 24 which preferably comprises semicircular bearing halves 24a and 24b (see FIG. 8) rigidly affixed to opposite sides of the drill pipe (not shown in FIGS. 6-8). This bearing is affixed above the top edge of the drill pipe/casing protector as described previously; a similar thrust bearing can be used below the bottom edge of the protector. The bearing halves are configured so that narrow slots 90 (see FIG. 8) are formed between the adjacent ends of the bearing halves when they are affixed to the drill pipe. Since the bearings are rigidly attached to the rotating drill pipe, centrifugal force causes the fluid, after passing through the grooves 25 on the I.D. of the sleeve, to be flung out from the narrow slots during use.

The ends of the bearing halves are angled to form a ramp 92 at each end. The adjacent ends of the bearing halves form an angular V-shaped notch at each slot 90. Similar "V" notches 94 are formed by ramp surfaces spaced 180° apart from the "V" notches at the ends of the bearing halves. This, in effect, produces four "V" notches spaced apart uniformly at 90° intervals around the bottom surface of the bearing, as shown best in FIG. 8.

In addition to the four "V" notches, the bottom of each bearing half has an angled face 96 extending circumferentially around the inside of the bearing. The angular face 96 faces downwardly toward the bottom edge of the drill pipe/casing protector.

During use, when the fluid is flung out of the slots 90 it is replaced by fluid drawn up from between the sleeve and the drill pipe. The ramps help to force the fluid between the bearings and the ends of the sleeve, and the thrust bearings reduce induced torque by pumping the fluid through the series of ramps and slots to lubricate and support the sleeve. That is, the slots supply fluid to the ramps, drawing some of that fluid up from between the sleeve and the drill pipe through the channels 25; the ramps provide a wedged cushion of fluid that cools, lubricates and supports the interface between the bearing and the sleeve.

FIG. 9 illustrates an alternate technique for mounting the drill pipe protector sleeve of this invention to a drill pipe. In this embodiment, the sleeve 22a is mounted to the drill pipe 12a between an upper thrust bearing collar 24a and a lower thrust bearing collar 26a. In this embodiment, the upper and lower thrust bearing collars 24a and 26a are at the top and bottom of a single integral protector sleeve retainer having a cylindrical section 60 on which the sleeve 22a is retained. The retainer ring 60 is rigidly affixed to the O.D. of the drill pipe 12a so that the retainer rotates with the drill pipe. Fasteners 61 in the flanged upper and lower thrust bearing collars provide a means for rigidly affixing the retainer to the O.D. of the drill pipe. The O.D. of the sleeve 22a projects outwardly beyond the O.D. of the thrust bearing collars 24a and 26a (and the adjacent tool joints). The I.D. 62 of the sleeve has a double-wedge configuration, similar to that described above for the sleeve 22, to provide the means for allowing the drill pipe and the O.D. of the retainer ring 60 to rotate relative to the I.D. 62 of the sleeve 22a, when contact is made between the O.D. of the sleeve 22a and the wall of an adjacent casing or bore. The upper and lower thrust bearing collars 24a and 26a also can have relief sections similar to the relief areas 51 described previously for allowing fluid flowing in the vertical channels 64 of the sleeve to produce a fluid cushion at the interface 66. This provides a means for maintaining the separation between the annular top and bottom edges of the sleeve 22a and the adjacent upper and lower thrust bearing collars 24a and 26a.

FIG. 10 illustrates a further alternative means for mounting the drill pipe protector sleeve to a drill pipe. In this embodiment, a cylindrical retainer ring 68 is rigidly affixed to the O.D. of a drill pipe 12b. A drill pipe protector sleeve 22b, according to principles of this invention, is secured to the retainer ring 68. The rubber protector sleeve 22b has an annular recess 70 which matches the cylindrical annular configuration of the retainer sleeve 68. The protector sleeve 22b further includes upper and lower sections 72 and 74 extending above and below the retainer ring and the recess 70 in the sleeve. During use, when contact is made between the O.D. of the rubber protector sleeve (also having the double-wedge configuration described previously) and the I.D. of an adjacent casing or well bore, the sleeve stops rotating or rotates slightly relative to the rotating drill pipe 12b in a manner similar to that described previously. In this embodiment, the rubber protector sleeve has upper and lower interfaces at 76 and 78 between the I.D. of the sleeve and the O.D. of the drill pipe above and below the retainer ring. In these interface regions, the double-wedge configuration described previously for the I.D. of the rubber protector sleeve produces the thin film of fluid at the interfaces 76 and 78. A further annular interface 80 between the O.D. of the retainer ring 68 and the I.D. of the recess 70 is provided by a double-wedge configuration that also produces a thin film of fluid at that interface during use.

EXAMPLE

A drill pipe protector sleeve similar to that described with respect to FIGS. 2 through 5 was tested on Exxon's Hondo platform at Santa Barbara, Calif., on Well H-37. It ran a total of 203 rotating hours and was on the pipe while 4,327 feet of well bore was drilled. The sleeve was installed 1,500 feet below the rotary table and removed 5,827 feet below the table. The hole angle was 5° when installed and was approximately 70° when removed. The 7-¼ inch O.D. of the rubber sleeve, when removed, gaged at zero wear, and the 5 inch I.D. showed 1/16th inch wear. The area on the drill pipe where the sleeve was tested showed zero wear. It was observed that the sleeve under test has excellent potential for rotary torque reduction, casing protection and long life. The conventional type drill pipe protection (as described in FIG. 1) that was used in the hole during this period was separating from its frame, showed excessive wear, and had a considerably shorter life.

What is claimed is:

1. For use inside a bore in an underground formation or in a tubular casing installed in the formation, in which a rotary drill pipe extends through the bore or the casing so that drill pipe is surrounded by a wall surface of the bore or casing, a drill pipe protector assembly comprising:

a protective sleeve secured around an exterior surface of the drill pipe, the sleeve having an outside diameter larger than the outside diameter of the drill pipe and substantially less than the inside diameter of said wall surface to provide protection for said wall surface and for the drill pipe, upon contact between an outside surface of the sleeve and the wall surface caused by the drill pipe deflecting off-center in said casing or bore;

mounting means between an inside face of the sleeve and the drill pipe for causing the sleeve to rotate with the rotary drill pipe during normal rotary drilling operations in which there is an absence of contact between the sleeve and the wall surface, the mounting means causing the sleeve to undergo a substantial reduction in its rate of rotation relative to the drill pipe while allowing the drill pipe to continue rotating relative to the sleeve upon frictional contact between the outside surface of the sleeve and the wall surface; and bearing means affixed to the drill pipe for maintaining the sleeve in a fixed axial position on the rotary drill pipe during rotation of the drill pipe and sleeve and during contact of the sleeve with the wall surface, in which the mounting means includes a double-wedge arrangement including means for slightly separating the sleeve from the drilling pipe by producing a film of lubricating and supporting fluid at the interface between the drill pipe and the inside face of the sleeve which tends to reduce the effects of torque or drag acting on the rotating drill pipe when the sleeve contacts said wall surface.

2. Apparatus according to claim 1 in which the torque applied to the rotary drill pipe upon contact between the sleeve and the wall surface is reduced by a factor proportional to the radial distance from the O.D. of the sleeve to the O.D. of the drill pipe, when compared with the greater torque level produced on the rotary drill pipe by a protector of the same outside diameter as the sleeve which is rigidly affixed to the drill pipe.

3. Apparatus according to claim 1 including a double-wedge arrangement on the O.D. of the sleeve for contact with the wall surface which tends to produce a film of lubricating and supporting fluid at the interface between the O.D. of the sleeve and the wall surface to further reduce the effects of torque or drag acting on the drill pipe.

4. Apparatus according to claim 1 including longitudinally extending and circumferentially spaced apart grooves formed in the I.D. of the sleeve and located between each double wedge for allowing fluid under pressure to circulate through the space between the I.D. of the sleeve and the O.D. of the drill pipe, including fluid flowing to wedged I.D. faces of the sleeve to separate the I.D. of the sleeve from the drill pipe upon circulation of the fluid through the grooves.

5. Apparatus according to claim 1 in which the bearing means comprises separate thrust bearings rigidly affixed above and below the sleeve, and in which a spacing is maintained between each thrust bearing and an adjacent edge of the sleeve.

6. Apparatus according to claim 5 in which the thrust bearing includes means for pumping fluid from the surrounding bore through a series of ramps and slots at the interface between the bearing and the drill pipe to lubricate and support the sleeve on the drill pipe.

7. Apparatus according to claim 1 in which the sleeve is mounted around the drill-pipe and adjacent to a tool joint on the drill pipe to protect the tool joint from contact with the wall surface.

8. Apparatus according to claim 1 in which the sleeve is mounted to the drill pipe by a split ring and connected assembly.

9. Apparatus according to claim 1 in which the sleeve is made from an elastomeric material.

10. Apparatus according to claim 9 including longitudinally extending and circumferentially spaced apart grooves formed in the I.D. of the sleeve and located between of each double wedge for allowing fluid under rotation-induced pressure and hydrostatic pressure to circulate through the space between the inside face of the sleeve and the outside of the drill pipe, including fluid flowing to wedged I.D. faces of the sleeve to separate the inside of the sleeve from the drill pipe upon circulation of the fluid through the grooves.

11. A drill pipe protector adapted for mounting on a rotary drill pipe for rotating inside a bore in an underground formation or in a tubular casing installed in such a formation, the drill pipe having an outside diameter normally spaced from an inside wall surface of the bore or casing, the drill pipe protecting comprising:
 a protective sleeve having a sleeve inside face for mounting around the outside of the drill pipe and a sleeve outside diameter larger than the outside diameter of the drill pipe and its adjacent tool joints, the sleeve outside diameter also being substantially less than the inside diameter of said inside wall surface, to provide protection for the wall surface and for the drill pipe and its tool joints upon frictional contact between the sleeve and said inside wall surface caused by the drill pipe deflecting off-center in said casing or bore; and
 mounting means on the inside face of the sleeve for normally holding the sleeve around the drill pipe to rotate with the drill pipe during normal drilling operations, said mounting means causing the sleeve to undergo a substantial reduction in rotation rate while the drill pipe continuous rotating within the sleeve at a substantially greater rate of rotation, upon said frictional contact between the outside surface of the sleeve and said inside wall surface,
 in which the mounting means includes a double-wedge arrangement including means for slightly separating the sleeve from the drill pipe for producing a film of lubricating and supporting fluid at the interface between the drill pipe and the inside face of the sleeve which tends to reduce the torque or drag acting on the rotating drill pipe when the sleeve contacts said inside wall surface.

12. Apparatus according to claim 11 in which the torque applied to the rotary drill pipe upon contact between the sleeve and the bore is reduced by a factor proportional to the radial distance from the O.D. of the sleeve to the O.D. of the drill pipe, when compared with the greater torque level produced on the rotary drill pipe by a protector of the same diameter as the sleeve, but rigidly affixed to the drill pipe.

13. Apparatus according to claim 11 including a double-wedge arrangement on the O.D. of the sleeve for contact with the wall surface which tends to produce a film of lubricating and supporting fluid at the interface between the O.D. of the sleeve and the inside wall surface to further reduce the effects of torque acting on the drill pipe.

14. Apparatus according to claim 11 including bearing means for maintaining the sleeve in a fixed axial position on the drill pipe, and in which the bearing means comprises separate thrust bearings rigidly affixed above and below the sleeve, and a spacing is maintained between each thrust bearing and an adjacent edge of the sleeve.

15. Apparatus according to claim 11 including bearing means for maintaining the sleeve in a fixed axial position on the drill pipe.

16. Apparatus according to claim 11 including a rigid reinforcing member embedded within the sleeve for reinforcing the strength of the sleeve.

17. Apparatus according to claim 16 in which the sleeve is mounted to the drill pipe by a split ring and connection assembly in which connecting means for holding opposite sides of the split ring together are integral with the embedded reinforcing member.

18. Apparatus according to claim 11 in which the sleeve is mounted to the outside diameter of the drill pipe by a rigid reinforcing ring rigidly affixed to the outside diameter of the drill pipe and mounting the sleeve to the drill pipe so that relative rotation between the sleeve and pipe occurs at the interface between the O.D. of the reinforcing ring and the I.D. of the sleeve.

19. An underground drilling system comprising:
 a well bore in an underground formation;
 a fixed tubular casing installed in the well bore;
 a rotary drill pipe extending through the casing and having an O.D. spaced from an I.D. of the casing or well bore during normal drilling operations;
 a protective sleeve mounted around the drill pipe and spaced from the I.D. of the casing or bore for preferentially contacting the I.D. of the casing or bore when the drill pipe deflects off-center in the casing or bore to protect the casing or bore from contact with the drill pipe or its tool joints during rotation of the drill pipe, the protective sleeve being mounted to the drill pipe to substantially reduce the rotational rate of the sleeve upon frictional contact of the sleeve with the I.D. of the casing or bore while allowing the rotary drill pipe to continue rotating within the sleeve at a rotation rate sufficient to conduct drilling operations in the formation; and mounting means between the sleeve and drill pipe comprising a double-wedge arrangement including means for producing a film of lubricating and supporting fluid between the O.D. of the drill pipe and the I.D. of the sleeve during drilling operations in the formation which tends to reduce the effects of torque or drag acting on the rotating drill pipe when the sleeve contacts the casing or bore.

20. Apparatus according to claim 19 in which the reactive torque applied to the rotary drill pipe upon contact between the sleeve and the wall of the casing or well bore is reduced by a factor proportional to the radial distance from the O.D. of the sleeve to the O.D. of the drill pipe, when compared with the greater torque level produced on the rotary drill pipe by a protector of the same outside diameter as the sleeve, but rigidly affixed to the drill pipe.

21. Apparatus according to claim 19 further including a double-wedge arrangement including means for producing a film of lubricating and supporting fluid between the O.D. of the sleeve and the I.D. of the casing or bore.

22. Apparatus according to claim 19 including thrust bearing means rigidly affixed to the drill pipe and arranged thereon for retaining the sleeve in a fixed axial position on the drill pipe.

23. Apparatus according to claim 22 in which the thrust bearing means comprise upper and lower thrust bearing collars disposed above and below the sleeve, and means for circulating fluid through an interface between at least one of the bearing collars and an end of the sleeve for maintaining a fluid cushion between the bearing collar and sleeve to retain the sleeve in its fixed axial position on the drill pipe during drilling operations.

24. Apparatus according to claim 19 in which the sleeve is mounted to the drill pipe by means for circulating drilling fluid from the annulus between the drill pipe and the casing into the space between the drill pipe and the I.D. of the sleeve to produce a fluid film in this space which reduces frictional drag between the sleeve and the drill pipe.

25. Apparatus according to claim 24 including wedge shaped I.D. faces of the sleeve between adjacent longitudinal grooves to separate the I.D. of the sleeve from the O.D. of the drill pipe upon circulation of the fluid through said space.

26. A method for drilling a bore in an underground formation, the method comprising mounting a protective sleeve at one or more spaced apart locations along a drill pipe that rotates within the bore during drilling operations, including mounting the protective sleeve around the drill pipe for rotation with the drill pipe during normal drilling operations so as to preferentially contact the wall surface of the bore or a casing installed in the bore to protect the wall surface of the bore or casing or the rotating drill pipe from damage, the sleeve being mounted to the drill pipe so that upon frictional contact between said wall surface and the outer surface of the sleeve, the sleeve is caused to greatly reduce its rotational rate upon said contact while allowing the drill pipe to continue rotating within the sleeve sufficiently to conduct drilling operations in the formation.

27. An underground drilling system comprising:
a well bore in an underground formation;
a fixed tubular casing installed in the well bore;
a rotary drill pipe extending through the casing and having an O.D. spaced from an I.D. of the casing or well bore during normal drilling operations;
a protective sleeve mounted around the drill pipe and spaced from the I.D. of the casing or bore for preferentially contacting the I.D. of the casing or bore when the drill pipe deflects off-center in the casing or bore to protect the casing or bore from contact with the drill pipe or its tool joints during rotation of the drill pipe, the protective sleeve being mounted to the drill pipe to substantially reduce the rotational rate of the sleeve upon frictional contact of the sleeve with the I.D. of the casing or bore while allowing the rotary drill pipe to continue rotating within the sleeve at a rotation rate sufficient to conduct drilling operations in the formation;
longitudinally extending and circumferentially spaced apart grooves forward in an I.D. wall of the sleeve for allowing fluid under pressure to circulate through a space formed between the I.D. of the sleeve and the O.D. of the drill pipe; and
two wedge-shaped regions of the I.D. wall of the sleeve between adjacent grooves for causing the sleeve to separate from the O.D. of the drill pipe upon circulation of a fluid film under pressure between the sleeve and drill pipe.

28. Apparatus according to claim 27, including bearing means above and below the sleeve for maintaining the sleeve in a fixed axial position on the drill pipe, in which the bearing means are rigidly but releasably fastened to the O.D. of the drill pipe at short clearance distances above and below the top and bottom of the sleeve; and in which the sleeve is formed as a split ring and is removably mounted to the drill pipe.

29. Apparatus according to claim 28, including rigid reinforcing means embedded within the sleeve for reinforcing the strength of the sleeve, and in which the split ring has connection means for holding opposite sides of the split ring together, said connection means being integral with the embedded reinforcing means.

30. Apparatus according to claim 28, in which the bearing means comprise rigid upper and lower bearings each mounted to the drill pipe as a split ring having fastening means for removably attaching each split ring to the O.D. of the drill pipe.

31. An underground drilling apparatus for drilling a well bore in an underground formation, in which the drilling apparatus extends through a bore in the formation or through a tubular casing installed in the formation, the drilling apparatus comprising:
a rotary drill pipe extending through the bore or casing so the drill pipe is surrounded by an inside wall surface of the bore or casing;
an annular protective sleeve removably secured around an outer surface of the drill pipe and spaced from the inside wall surface of the casing or bore, the sleeve having a split-ring configuration for use in placing the sleeve around the side of the drill pipe, and fastening means on the split ring for joining opposite sides of the split ring together to removably mount the sleeve to the drill pipe, the sleeve having an outside diameter greater than the outside diameter of the drill pipe to provide protection for said inside wall surface and for the drill pipe, upon frictional contact between an outside surface of the sleeve and said inside wall surface caused by the drill pipe deflecting offcenter in said casing or bore;

the sleeve having an annular inside surface configured and arranged to form a slight separation between the inside surface of the sleeve and the outer surface of the drill pipe so that, upon said frictional contact between the outside surface of the sleeve and said inside wall surface, the drill pipe continues to rotate inside the sleeve while causing a greatly reduced rate of rotation of the sleeve relative to the drill pipe, to provide said protection for the inside wall surface and the drill pipe; and upper and lower bearing means rigidly affixed to the outer surface of the drill pipe above and below the sleeve for maintaining the sleeve mounted in a fixed axial position on the rotary drill pipe, and upper and lower bearing means each having a split ring configuration for use in placing each bearing means around the side of the drill pipe, and fastening means for rigidly but removably mounting each split ring bearing means to the drill pipe, the upper and lower bearing means thereby being adapted for mounting to axially spaced apart locations along the drill pipe as the drill pipe is extended down-hole in the bore, with said protective sleeve being mounted between a corresponding set of upper and lower bearing means, the protective sleeves each having an outside diameter greater than the outside diameters of their corresponding upper and lower bearing means for providing said protection at axially spaced apart locations along the drilling apparatus as the drill pipe is extended down-hole.

32. Apparatus according to claim 31, in which the torque applied to the rotary drill pipe upon contact between the sleeve and said inside wall surface is reduced by a factor proportional to the radial distance from the O.D. of the sleeve to the O.D. of the drill pipe, when compared with the greater torque level produced on the rotary drill pipe by a protector of the same outside diameter as the sleeve which is rigidly affixed to the drill pipe.

33. Apparatus according to claim 31, in which the inside surface of the annular sleeve includes means for slightly separating the sleeve from the drill pipe by producing a film of lubricating and supporting fluid at the interface between the drill pipe and the inside diameter of the sleeve which tends to reduce torque or drag acting on the rotating drill pipe when the sleeve contacts said inside wall surface.

34. Apparatus according to claim 31, including a rigid circumferential reinforcing member and embedded within the sleeve for reinforcing the strength of the sleeve.

35. Apparatus according to claim 34, in which the fastening means for mounting the sleeve to the drill pipe are integral with the embedded reinforcing member.

36. Apparatus according to claim 31, including means for producing a film of lubricating and supporting fluid at the interface between the drill pipe and the inside surface of the sleeve which tends to reduce the effects of torque or drag acting on the drill pipe during contact between the sleeve and said inside wall surface, and means for circulating fluid through a space between at least one of the bearing means and an adjacent end of the sleeve for maintaining a fluid cushion between the bearing means and the sleeve to retain the sleeve in its fixed axial position on the drill pipe during drilling operations.

37. Apparatus according to claim 31, including circumferentially spaced apart longitudinal grooves extending axially along the inside surface of the sleeve, and wedge-shaped I.D. faces of the sleeve between adjacent grooves to separate the inside surface of the sleeve from the outer surface of the drill pipe upon circulation of a fluid film between the drill pipe and said wedge-shaped I.D. faces.

38. A method for drilling a well bore in an underground formation in which an elongated drill string extends through a tubular casing in at least a portion of the bore drilled in the formation, the method comprising:

extending a length of rotary drill pipe down-hole through the casing for drilling into formation below the casing, the casing having an inside diameter substantially greater than an outside diameter of the drill pipe;

removably mounting a plurality of protective sleeves around the drill pipe at axially spaced apart locations along the length of the drill pipe, each protective sleeve being placed around the side of the pipe as the pipe is extended down-hole;

each protective sleeve being mounted around the drill pipe between corresponding upper and lower bearings mounted to the drill pipe above and below the protective sleeve, so that each sleeve is retained axially at a fixed position on the drill pipe by the upper and lower bearings, the upper and lower bearings each being rigidly but removably mounted to the drill pipe, around the side of the drill pipe, as the drill pipe is being extended down-hole for drilling in the formation;

the protective sleeves having an outside diameter greater than the outside diameter of the drill pipe and greater than the outside diameters of their corresponding upper and lower bearings, the protective sleeves also having an outside diameter substantially less than the inside diameter of the casing so that normal drilling operations can be carried out in the formation below the casing without the sleeve contacting the inside wall of the casing, but in which deflection of the drill pipe from a centered position in the casing causes the outer surface of the sleeve to preferentially contact the inside wall surface of the casing to protect the wall surface of the casing and the rotating drill pipe from damage, the sleeve being mounted around the drill pipe so that, upon frictional contact between the sleeve and the wall surface of the casing, the drill pipe continues to rotate in the sleeve while causing a greatly reduced rate of rotation of the sleeve relative to the drill pipe to provide said protection for the wall surface of the casing and the drill pipe while continuing to conduct drilling operations in the formation.

39. The method according to claim 38, including mounting the protective sleeve to the drill pipe as a split-ring arrangement placed around the side of the drill pipe, and mounting the upper and lower bearings to the drill pipe also in a split ring arrangement in which each upper and lower bearing is mounted around the side of the drill pipe.

40. The method according to claim 38, including producing a thin film of fluid in the space between the I.D. of the sleeve and the O.D. of the drill pipe upon contact between the sleeve and the wall surface to reduce drag or torque acting on the rotating drill pipe caused upon contact of the sleeve with the wall surface.

41. Th method according to claim 38, in which a fluid cushion is produced between an end of the sleeve and an adjacent bearing to maintain axial separation between the sleeve and bearing upon contact between the sleeve and the wall surface of the casing.

42. The method according to claim 38, including circumferentially spaced apart longitudinally grooves extending axially along the inside surface of the sleeve, and wedge-shaped I.D. faces of the sleeve between adjacent grooves to separate the inside surface of the sleeve from the outer surface of the drill pipe upon circulation of a fluid film between the drill pipe and said wedge-shaped I.D. faces.

43. For use inside a bore in an underground formation or in a tubular casing installed in the formation, in which a rotary drill pipe extends through the bore or casing so the drill pipe is surrounded by an inside wall surface of the bore or casing, the drill pipe protector assembly comprising:

a protective sleeve secured around an exterior surface of the drill pipe, the sleeve having an outside diameter larger than the outside diameter of the drill pipe to provide protection for said well surface and for the drill pipe, upon contact between an outer surface of the sleeve and said inside wall surface;

the sleeve having a slit-ring configuration for use in placing the sleeve around the side of the drill pipe;

a rigid circumferential reinforcing member embedded in the sleeve for reinforcing the strength of the sleeve;

fastening means along an interface of the split ring of the sleeve for joining opposite sides of the sleeve together along the interface to removably secure the sleeve around the drill pipe, said fastening means being integral with the embedded reinforcing member;

the sleeve having an annular inside surface configured and arranged to form a slight separation between the inside surface of the sleeve and the outer surface of the drill pipe so that upon contact between the outer surface of the sleeve and said inside wall surface, the drill pipe continues to rotate inside the sleeve while causing a greatly reduced rate of rotation of the sleeve relative to the drill pipe to provide said protection for the wall surface and the drill pipe; and bearing means rigidly but removably affixed to the drill pipe for maintaining the sleeve in a fixed axial position on the rotary drill pipe during rotation of the drill pipe and its contact with the wall surface, the outside surfaces of the sleeve and bearing means being spaced from said inside wall surface and being positioned to provide said protection by the sleeve preferentially contacting the wall surface when the drill pipe is deflected off-center in the bore.

44. Apparatus according to claim 43, in which the bearing means comprise upper and lower bearings each separately affixed to the drill pipe.

45. Apparatus according to claim 44, in which the upper bearing and the lower bearing each comprise a split-ring bearing with fastening means for rigidly, but removably affixing each bearing to the drill pipe.

46. Apparatus according to claim 44, including circumferentially spaced apart longitudinal grooves extending axially along the inside surface of the sleeve, and wedge-shaped I.D. faces of the sleeve between adjacent grooves to separate the inside surface of the sleeve from the outer surface of the drill pipe upon circulation of a fluid film between the drill pipe and said wedge-shaped I.D. faces.

* * * * *

UNITED STATES PATENT AND TRADEMARK OFFICE
CERTIFICATE OF CORRECTION

PATENT NO. : 5,069,297

DATED : December 3, 1991

INVENTOR(S) : R.E. Krueger, deceased; R.E. Krueger; W.E. Krueger

It is certified that error appears in the above-identified patent and that said Letters Patent is hereby corrected as shown below:

On the Title Page

[75] Inventors, list the inventors as follows:
-- Rudolph E. Krueger, deceased, late of Newport Beach, by Vera B. Krueger, legal representative; R. Ernst Krueger, Newport Beach; William E. Krueger, Orange, all of Calif. --

Column 1, line 49, change "4,796,670 Russell, et al." to -- 4,796,670-Russell, et al." --.

Column 1, line 50, after "3,480,094" insert-- -Morris. The prior art drill pipe protectors are --.

Column 2, line 25, after "exterior" change "to" to -- of --.

Column 7, line 31, change "O.D" to -- O.D. --.

In the Claims

Column 11, line 41, after "ring and" change "connected" to -- connecting --.

Column 11, line 48, after "between" delete "of".

Column 11, line 60, after "drill pipe" change "protecting" to -- protector --.

UNITED STATES PATENT AND TRADEMARK OFFICE
CERTIFICATE OF CORRECTION

PATENT NO. : 5,069,297

DATED : December 3, 1991

INVENTOR(S) : R.E. Krueger, deceased; R.E. Krueger; W.E. Krueger

It is certified that error appears in the above-identified patent and that said Letters Patent is hereby corrected as shown below:

Column 12, line 9, after "drill pipe" change "continuous" to -- continues --.

Column 14, line 29, after "grooves" change "forward" to -- formed --.

Column 15, line 10, change "offcenter" to -- off-center --.

Column 15,, line 25, before "upper" change "and" to -- the --.

Column 17, line 10, before "method" change "Th" to -- The --.

Column 17, line 36, change "slit-ring" to -- split-ring --.

Signed and Sealed this

Fourteenth Day of June, 1994

BRUCE LEHMAN

Attest:

Attesting Officer

Commissioner of Patents and Trademarks